(12) United States Patent
Yamazaki et al.

(10) Patent No.: US 9,838,619 B2
(45) Date of Patent: Dec. 5, 2017

(54) RADIATION IMAGING APPARATUS AND RADIATION INSPECTION APPARATUS

(71) Applicant: CANON KABUSHIKI KAISHA, Tokyo (JP)

(72) Inventors: Takashi Yamazaki, Asaka (JP); Hidehiko Saito, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 393 days.

(21) Appl. No.: 14/308,829

(22) Filed: Jun. 19, 2014

(65) Prior Publication Data

US 2015/0001394 A1    Jan. 1, 2015

(30) Foreign Application Priority Data

Jul. 1, 2013  (JP) .................................. 2013-138444

(51) Int. Cl.
*H04N 5/32*   (2006.01)
*H04N 5/355*  (2011.01)
*H04N 5/365*  (2011.01)
*H04N 5/367*  (2011.01)
*H04N 5/363*  (2011.01)

(52) U.S. Cl.
CPC ............. *H04N 5/32* (2013.01); *H04N 5/3559* (2013.01); *H04N 5/365* (2013.01); *H04N 5/367* (2013.01); *H04N 5/363* (2013.01)

(58) Field of Classification Search
CPC ... H04N 5/3742; H04N 3/155; H04N 5/35563
See application file for complete search history.

(56) References Cited

U.S. PATENT DOCUMENTS

| 6,078,037 A | * | 6/2000 | Booth, Jr. | ......... H01L 27/14609 |
|---|---|---|---|---|
| | | | | 250/208.1 |
| 6,999,119 B1 | * | 2/2006 | Shibazaki | .............. H04N 9/045 |
| | | | | 348/230.1 |
| 2006/0050163 A1 | * | 3/2006 | Wang | ..................... H04N 3/155 |
| | | | | 348/308 |
| 2012/0104267 A1 | * | 5/2012 | Matsumoto | .............. H04N 5/33 |
| | | | | 250/370.08 |

(Continued)

FOREIGN PATENT DOCUMENTS

| JP | 2002-344809 | 11/2002 |
|---|---|---|
| JP | 2011-525783 | 9/2011 |

(Continued)

*Primary Examiner* — Kenneth J Malkowski
(74) *Attorney, Agent, or Firm* — Fitzpatrick, Cella, Harper & Scinto

(57) ABSTRACT

A radiation imaging apparatus, comprising a sensor array in which a plurality of sensors are arranged, each includes a first holding unit for holding a first signal obtained with a first sensitivity and a second holding unit for holding a second signal obtained with a second sensitivity, a row selecting unit for selecting each sensor on a row basis, a signal readout unit for reading out a signal from each of the selected sensors, and a control unit configured to perform first control to control the sensor array so as to make the first holding units hold the first signals and make the second holding units hold the second signals, and perform second control to control the row selecting unit so as to make the signal readout unit read out the first and the second signals.

16 Claims, 13 Drawing Sheets

(56) References Cited

U.S. PATENT DOCUMENTS

| 2013/0070135 A1* | 3/2013 | Bahukhandi | H04N 5/37455 |
| | | | 348/300 |
| 2013/0327950 A1 | 12/2013 | Niwa et al. | 250/395 |
| 2014/0036118 A1 | 2/2014 | Dowaki et al. | 348/294 |
| 2014/0037056 A1 | 2/2014 | Naito et al. | 378/62 |

FOREIGN PATENT DOCUMENTS

| JP | 2011-525983 | 9/2011 | |
| NL | WO 2009156927 A2 * | 12/2009 | G01T 1/24 |
| WO | WO 2009/156927 A2 | 12/2009 | |

* cited by examiner

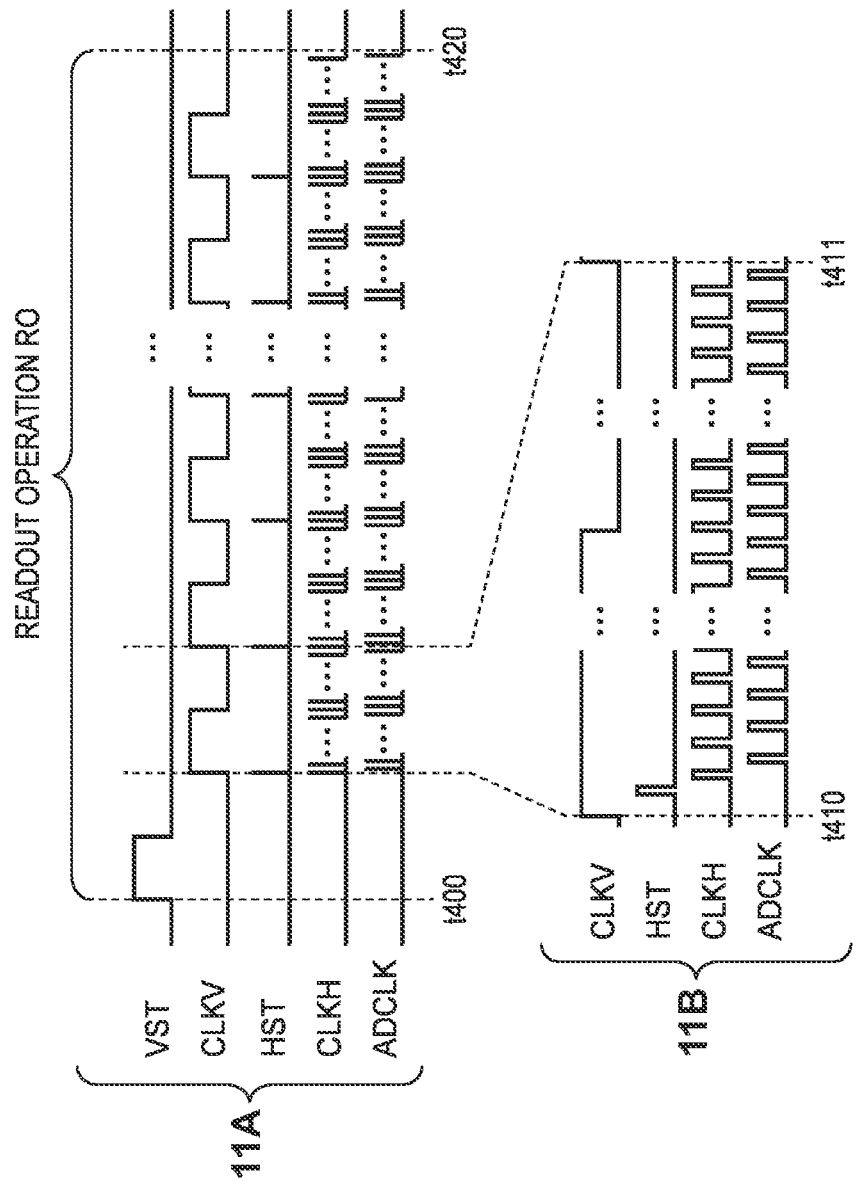
F I G. 11

RADIATION IMAGING APPARATUS AND RADIATION INSPECTION APPARATUS

BACKGROUND OF THE INVENTION

Field of the Invention

The present invention relates to a radiation imaging apparatus and a radiation inspection apparatus.

Description of the Related Art

Japanese Patent Laid-Open No. 2002-344809 discloses a radiation imaging apparatus in which each sensor of a sensor array includes a holding unit (sample/hold circuit) which holds a signal corresponding to the radiation dose of irradiation. According to Japanese Patent Laid-Open No. 2002-344809, since the holding units of the respective sensors individually hold signals corresponding to radiation doses, it is possible to simultaneously perform readout of one frame (signal readout) and irradiation of radiation for the next frame.

The radiation imaging apparatus can have an operation mode of obtaining signals with, for example, two sensitivities in each sensor and generating image data by using the signals (for example, an operation mode of performing dynamic range expansion). As one method of implementing this operation mode, there is conceivable a method of providing two holding units in each sensor, holding the signals obtained with the respective sensitivities in the respective holding units, and individually reading out the signals.

Each sensor receives a control signal via a control line arranged in correspondence with the corresponding row of the sensor array. The apparatus performs signal readout by making the signal readout unit read out for each row a signal output from each sensor in response to a control signal. When performing signal readout, this control signal can cause a potential fluctuation at a column signal line for signal readout which intersects with a control line. For this reason, when each sensor from which a signal is to be read out is to be switched, it is necessary to perform signal readout after the settling of the potential fluctuation (after the lapse of a predetermined period). That is, it takes much time to read out signals from the respective sensors of the sensor array. This becomes conspicuous as the size of a sensor panel increases, the number of rows of the sensor array increases, and the wiring capacitance of each signal line increases.

SUMMARY OF THE INVENTION

The present invention is advantageous for a radiation imaging apparatus which detects radiation with a plurality of sensitivities when reading out signals obtained with the respective sensitivities.

One of the aspects of the present invention provides a radiation imaging apparatus, comprising a sensor array in which a plurality of sensors configured to detect radiation with first sensitivity and second sensitivity which are different from each other are arranged, wherein each of the plurality of sensors includes a first holding unit configured to hold a first signal obtained with the first sensitivity and a second holding unit configured to hold a second signal obtained with the second sensitivity, a row selecting unit configured to select each sensor of the sensor array on a row basis, a signal readout unit configured to read out a signal from each sensor on a row selected by the row selecting unit, and a control unit configured to perform first control to control the sensor array so as to make the first holding units collectively hold the first signals in the plurality of sensors and make the second holding units collectively hold the second signals in the plurality of sensors and perform second control to control the row selecting unit so as to make the signal readout unit read out the first signal and the second signal obtained by the first control from each sensor, wherein in the second control, after the signal readout unit reads out the first signal and the second signal respectively held by the first holding unit and the second holding unit of each sensor on a row selected by the row selecting unit, the control unit makes the row selecting unit select each sensor on a row different from the selected row.

Further features of the present invention will become apparent from the following description of exemplary embodiments with reference to the attached drawings.

BRIEF DESCRIPTION OF THE DRAWINGS

FIG. 11 is a timing chart for explaining an example of a method of controlling the signal readout unit in an example of an operation mode;

DESCRIPTION OF THE EMBODIMENTS

First Embodiment

Figure 1:
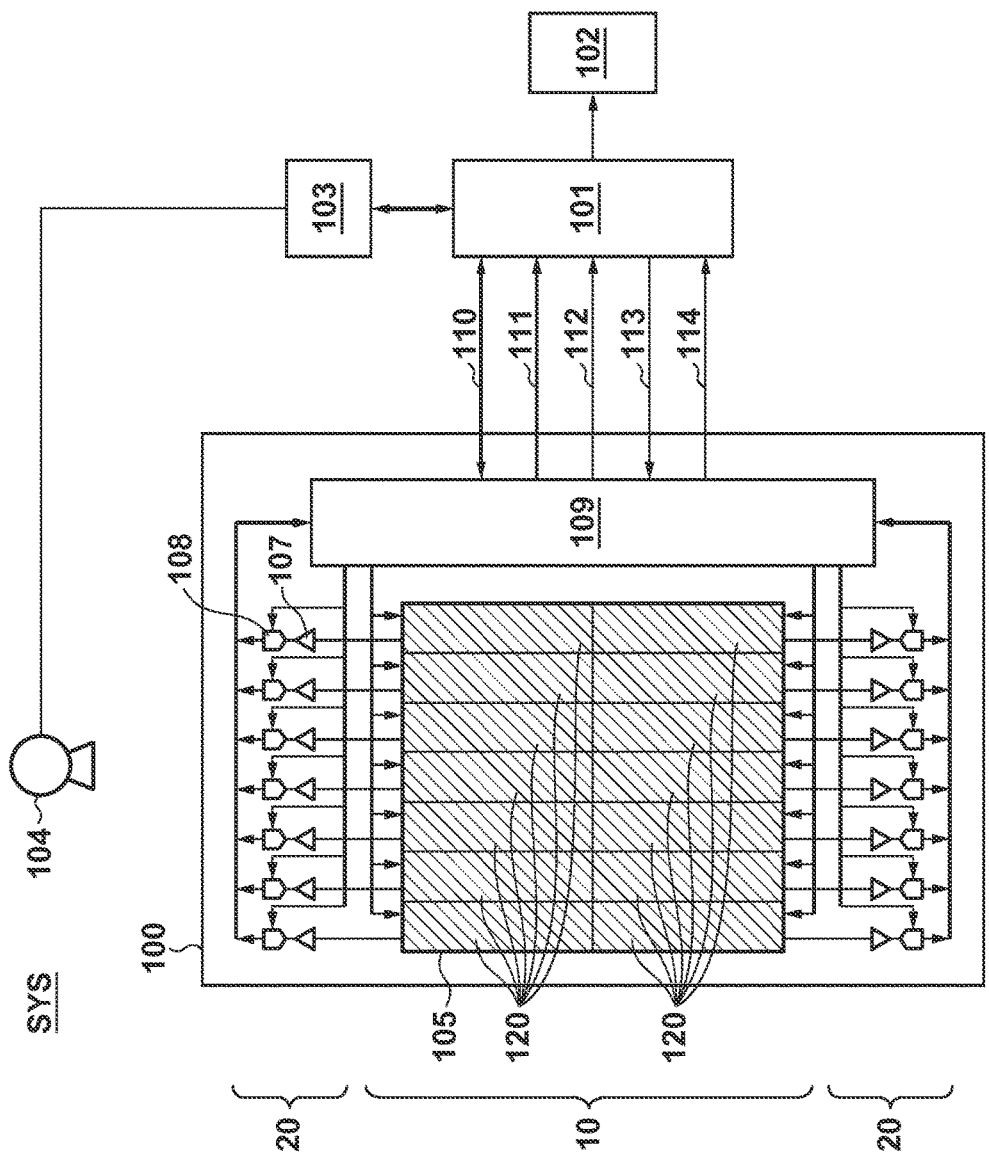
FIG. 1 is a block diagram for explaining an example of the arrangement of a radiation imaging system.

The first embodiment will be described with reference to FIGS. 1 to 7. FIG. 1 shows an example of the arrangement of a radiation imaging system SYS typified by a radiation imaging apparatus. The radiation imaging system SYS includes a radiation imaging apparatus 100 (to be referred to as the imaging apparatus 100 hereinafter), a radiation source 104 which generates radiation, an exposure control unit 103, a processor 101 which performs image processing and system control, and a display unit 102 including a display. When performing radiation imaging, the processor 101 can perform synchronous control of the imaging apparatus 100 and the exposure control unit 103. The imaging apparatus 100 detects radiation (X-rays, $\alpha$-rays, $\beta$-rays, $\gamma$-rays, or the like) passing through a subject to be examined, and the processor 101 and the like perform predetermined processing, thereby generating image data based on the radiation.

The display unit 102 displays the image data as a radiation image. The imaging apparatus 100 includes a sensor panel 105 including a sensor array 10, a signal readout unit 20 which reads out a signal from the sensor array 10, and a control unit 109 which controls each unit. The sensor array 10 includes a plurality of sensors arranged to form a plurality of rows and a plurality of columns.

The sensor panel 105 has a plurality of sensor units 120 tiled (two-dimensionally arranged) on a plate-like base. This arrangement can form the large sensor panel 105. Note that a plurality of sensors are arranged on each sensor unit 120. In addition, this embodiment exemplifies the arrangement in which the plurality of sensor units 120 are tiled to form 7 columns×2 rows. However, the present invention is not limited to this arrangement.

For example, a scintillator (not shown) for converting radiation into light can be provided on the sensor array 10. As each sensor, a known sensor designed to perform photoelectric conversion can be used. This makes it possible to obtain an electrical signal based on the radiation dose of irradiation.

The signal readout unit 20 can include signal amplifying units 107 including differential amplifiers and A/D conversion units 108 which perform analog/digital conversion (A/D conversion). In addition, for example, a plurality of electrodes for inputting/outputting electrical signals or supplying power are arranged on the upper and lower side portions of the sensor panel 105. Electrodes can be connected to an external circuit via a flying lead type printed wiring board (not shown). For example, the signal readout unit 20 reads out signals from the sensor array 10 via electrodes. In addition, the sensor array 10 receives control signals from the control unit 109 via electrodes.

The control unit 109 communicates control commands and synchronization signals with, for example, the processor 101, and outputs image data to the processor 101. The control unit 109 controls each unit of the sensor array 10 to perform, for example, drive control and operation mode control for each sensor. In addition, the control unit 109 composites, into one frame data, image data (digital data) from the sensor units 120 which are A/D-converted by the A/D conversion units 108 of the signal readout units 20, and outputs the data to the processor 101.

The control unit 109 and the processor 101 exchange control commands, control signals, and image data with each other via various types of interfaces. The processor 101 outputs setting information such as an operation mode and various types of parameters and imaging information to the control unit 109 via a control interface 110. In addition, the control unit 109 outputs apparatus information such as the operating state of the imaging apparatus 100 to the processor 101 via the control interface 110. The control unit 109 also outputs the image data obtained by the imaging apparatus 100 to the processor 101 via an image data interface 111. In addition, the control unit 109 notifies the processor 101, by using a READY signal 112, that the imaging apparatus 100 is ready for imaging. In response to the READY signal 112 from the control unit 109, the processor 101 notifies the control unit 109 of the irradiation start (exposure) timing of radiation by using an external synchronization signal 113. The control unit 109 also starts radiation irradiation by outputting a control signal to the exposure control unit 103 while an exposure permission signal 114 is in an enabled state.

Figure 2:
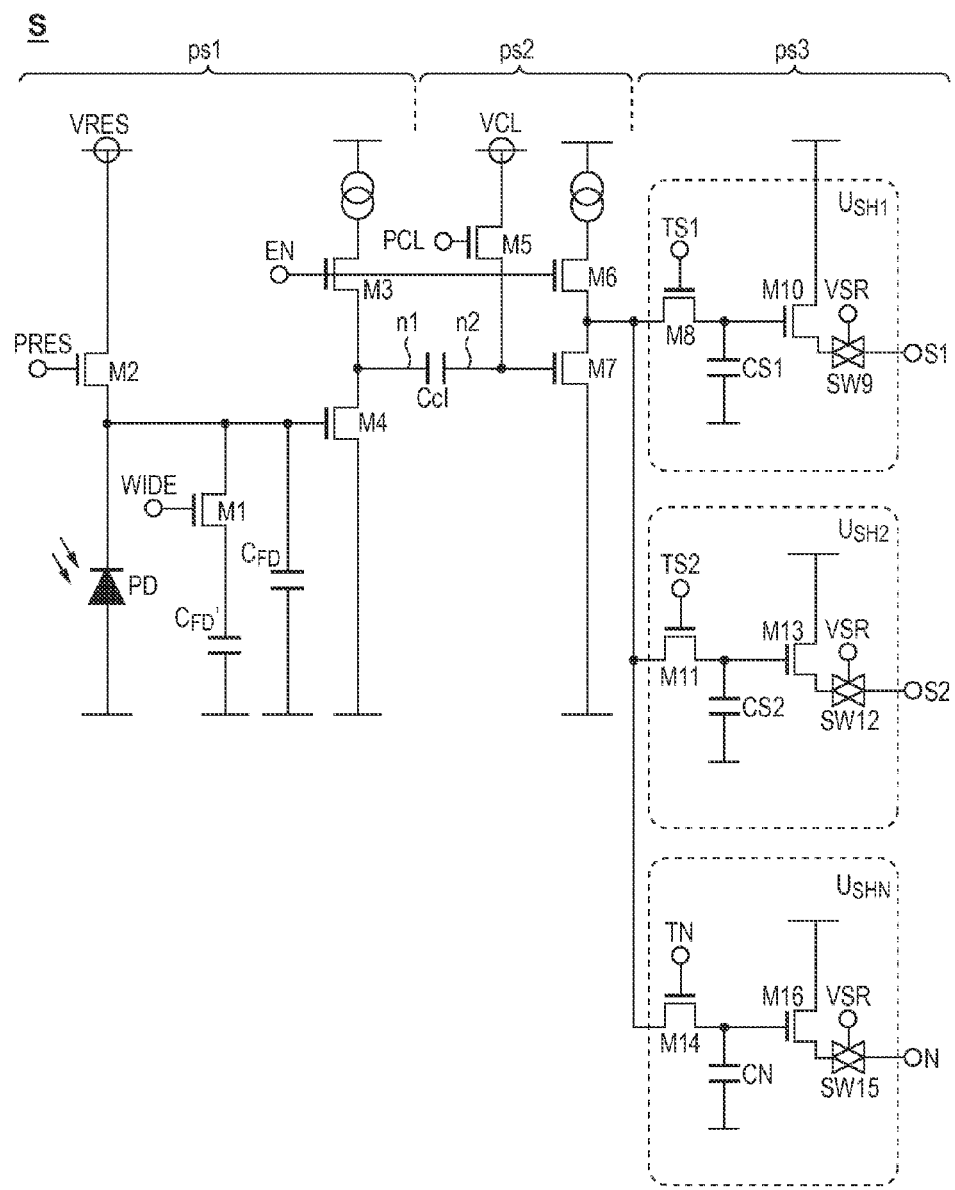
FIG. 2 is a circuit diagram for explaining an example of the arrangement of a sensor.

FIG. 2 exemplifies the circuit arrangement of a unit sensor S forming the sensor array 10. The sensor S can include, for example, a first portion ps1, a second portion ps2, and a third portion ps3. The first portion ps1 can include a photodiode PD, transistors M1 to M3, a floating diffusion capacitor $C_{FD}$ (to be referred to as the FD capacitor $C_{FD}$), and a sensitivity switching capacitor $C_{FD}'$. The photodiode PD is a photoelectric conversion element, and converts the light generated by the above scintillator in accordance with radiation irradiating a subject into an electrical signal. More specifically, the photodiode PD generates charges of an amount corresponding to the light, and outputs the voltage of the FD capacitor $C_{FD}$ corresponding to the amount of generated charges to the second portion ps2.

In addition, the sensitivity switching capacitor $C_{FD}'$ is used to switch between sensitivities for radiation from the sensor S, and is connected to the photodiode PD via the transistor M1 (switching element). Activating a signal WIDE will render the transistor M1 conductive to output the voltage of the composition capacitor of the FD capacitor $C_{FD}$ and the capacitor $C_{FD}'$ to the second portion ps2. In this manner, the sensor S changes the sensitivity for radiation depending on whether to use the capacitor $C_{FD}'$. In addition, activating a signal PRES in the transistor M2 will initialize the charges in the photodiode PD to reset the voltage output to the second portion ps2.

The second portion ps2 can include transistors M3 to M7, a clamp capacitor $C_{CL}$, and a constant current source. The transistor M3, the transistor M4, and the constant current source (for example, a transistor having a current mirror arrangement) are connected in series to form a current path. Activating an enable signal EN input to the gate of the transistor M3 will set the transistor M4 which receives a voltage from the first portion ps1 in an operating state. In this manner, a source follower circuit is formed to output a voltage corresponding to a voltage from the first portion ps1.

On the subsequent stage, a clamp circuit constituted by the transistors M5 to M7 and the clamp capacitor $C_{CL}$ is provided. More specifically, one terminal n1 of the clamp capacitor $C_{CL}$ is connected to the node between the transistor M3 and the transistor M4 of the first portion ps1. The other terminal n2 is connected to the transistor M5 functioning as a clamp switch. In addition, the transistor M6, the transistor M7, and the constant current source are connected in series to form a current path. The other terminal n2 is connected to the gate of the transistor M7. This arrangement removes kTC noise (so-called reset noise) generated in the photodiode PD of the first portion ps1.

More specifically, a voltage corresponding to the voltage from the first portion ps1 at the time of resetting described above is input to the terminal n1 of the clamp capacitor $C_{CL}$. In addition, activating a clamp signal PCL will make the transistor M5 conductive to input the clamp voltage VCL to the terminal n2 of the clamp capacitor $C_{CL}$. In this manner, the potential difference generated between the two terminals n1 and n2 of the clamp capacitor $C_{CL}$ is clamped as a noise component. Thereafter, a change in voltage accompanying the generation and accumulation of charges in the photodiode PD is output as a signal component.

In addition, the enable signal EN is also input to the gate of the transistor M6 and activated to set the transistor M7 in an operating state. In this manner, a source follow circuit is formed to output a voltage corresponding to the gate voltage of the transistor M7 to the third portion ps3.

The third portion ps3 includes transistors M8, M10, M11, M13, M14, and M16, analog switches SW9, SW12, and SW15, and capacitors CS1, CS2, and CN.

The transistor M8 and the capacitor CS1 form a sample/hold circuit, which functions as a holding unit for holding an output value from the second portion ps2. More specifically, by switching the state (the conductive state or non-conductive state) of the transistor M8 using a control signal TS1, to the signal (the signal based on a light component) obtained from the second portion ps2 is held in the capacitor CS1, that is, sampling is performed. In addition, the transistor M10 performs source follower operation to function as an amplifier. This amplifies the signal. The amplified signal is output to a terminal S1 by rendering the analog switch SW9 conductive using a control signal VSR. In this case, the unit formed by the transistors M8 and M10, the analog switch SW10, and the capacitor CS1 will be referred to as a first unit $U_{SH1}$.

Like the first unit $U_{SH1}$, the transistors M11 and M13, the analog switch SW12, and the capacitor CS2 form a second unit $U_{SH2}$ which outputs a signal from a terminal S2. For example, the first unit $U_{SH1}$ holds a signal (first signal) obtained when the sensor S operates with the first sensitivity. The second unit $U_{SH2}$ holds a signal (second signal) obtained when the sensor S operates with the second sensitivity (different from the first sensitivity).

Likewise, the transistors M14 and M16, the analog switch SW15, and the capacitor CN form a third unit $U_{SHN}$ which outputs a signal from a terminal N. Although described later, the third unit $U_{SHN}$ holds a reference signal, and, via the terminals S1, S2, and N, the signal readout unit 20 reads out the difference between the first signal and the reference signal when the first sensitivity is set, and reads out the difference between the second signal and the reference signal when the second sensitivity is set. This removes FPN (Fixed Pattern Noise) originating from the second portion ps2.

As an example of an operation mode, an example of a method of driving the sensor S in a moving image capturing mode will be described below with reference to FIG. 3. In this moving image capturing mode, the capacitors CS1 and CS2 hold, for example, the signals obtained with two sensitivities, and individually read out the signals. For example, it is possible to expand the dynamic range by using the respective signals obtained with two sensitivities.

Figure 3:
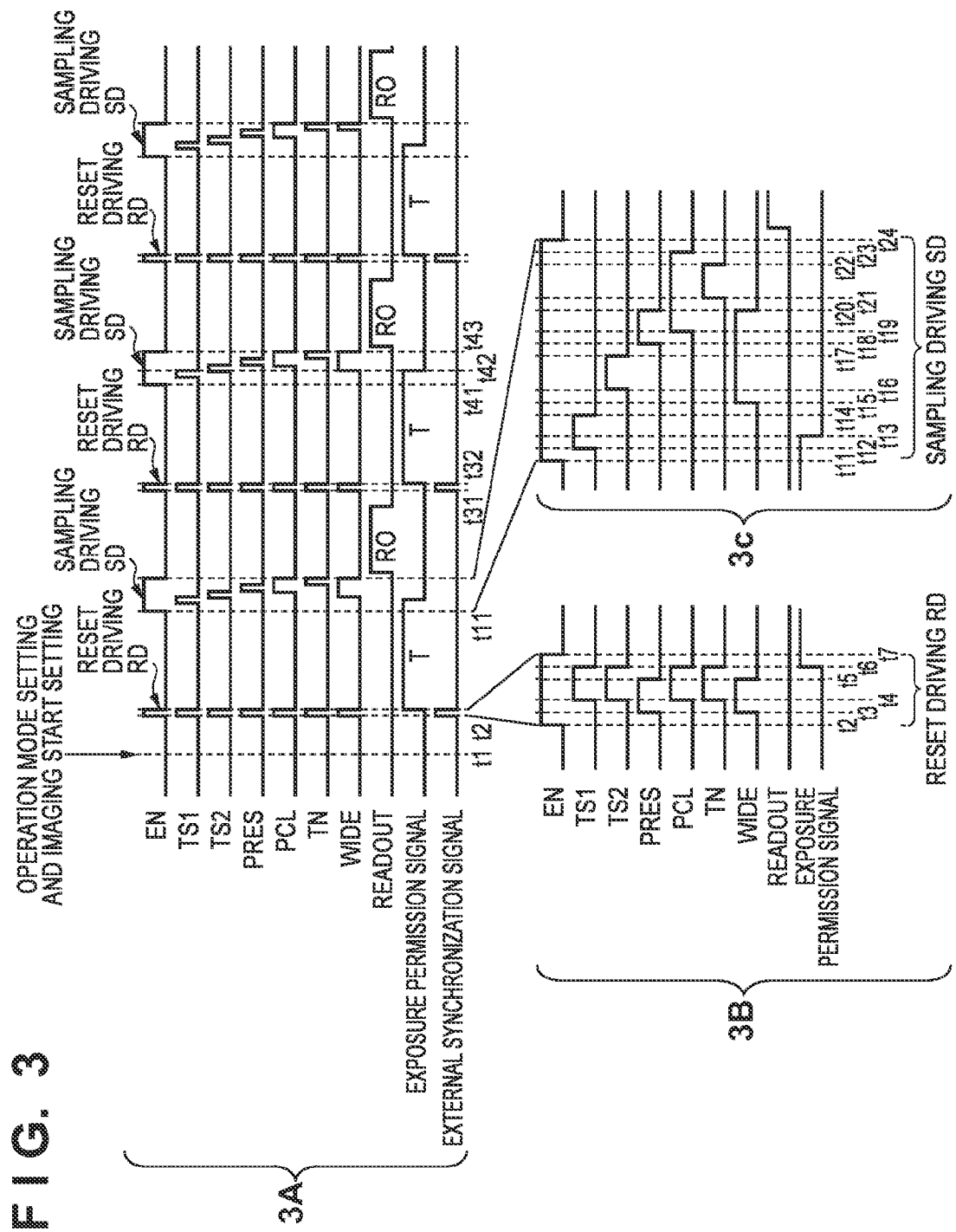
FIG. 3 is a timing chart for explaining an example of a method of controlling a sensor.

As exemplified by (A) in FIG. 3, operation mode setting and imaging start setting are performed at time t1. Thereafter, at time t2, the sensor S starts driving for imaging. The sensor S then alternately repeats reset driving RD exemplified by an enlarged view in (B) in FIG. 3 and sampling driving SD exemplified by an enlarged view in (C) in FIG. 3. After the sampling driving SD (and before the next reset driving RD), the sensor S performs readout operation RO of reading out a signal from the sensor array 10.

In reset driving RD, the sensor S operates to perform a reset operation and the operation of clamping, as a noise component, an output component obtained at the time of resetting. More specifically, as exemplified by (B) in FIG. 3, the sensor S renders the transistors M3 and M6 conductive at time t2 by setting the enable signal EN at High level. This makes the transistors M4 and M7 be ready for a source follower operation.

At time t3, the signals PRES and WIDE are set while rendering the transistor M1 for sensitivity switching conductive, thereby rendering the transistor M2 for resetting conductive at High level. This connects the photodiode PD to a reference voltage VRES to reset both the photodiode PD and the voltage of the capacitor $C_{FD}$'. In addition, one terminal n1 (the terminal on the transistor M4 side) of the clamp capacitor $C_{CL}$ receives a voltage corresponding to the gate voltage of the transistor M4 obtained immediately after resetting.

At time t4, a signal PCL is set at High level to render the transistor M5 for the above clamping operation conductive. With this operation, the other terminal n2 (the terminal on the transistor M7 side) of the clamp capacitor $C_{CL}$ receives a clamp voltage VCL.

In addition, at time t4, signals TS1, TS2, and TN are set at High level to render the transistors M8, M11, and M14 for the above sampling operation conductive. This sets all the capacitors CS1, CS2, and CN in an initial state (the voltage of an output value from the second portion ps2 when the gate voltage of the transistor M7 is set at the reference voltage VCL). At time t5, the signals PRES and WIDE are set at Low level to render the transistors M1 and M2 non-conductive. This fixes the capacitor $C_{FD}$' to a voltage obtained immediately after resetting because the transistor M1 is rendered non-conductive. In addition, a voltage corresponding to the gate voltage of the transistor M4 immediately after resetting is set at the terminal n1 of the clamp capacitor $C_{CL}$.

At time t6, the signal PCL is set at Low level to render the transistor M5 non-conductive. This makes the clamp capacitor $C_{CL}$ hold charges corresponding to the potential difference between the terminals n1 and n2 (the potential difference between a voltage based on the reference voltage VRES and the reference voltage VCL), thereby completing clamping of the above kTC noise.

In addition, at time t6, the signals TS1, TS2, and TN are set at Low level to render the transistors M8, M11, and M14 non-conductive. This fixes the voltages of the capacitors CS1, CS2, and CN.

Furthermore, at time t6, the exposure permission signal 114 described above is set at High level (permitted state). Subsequently, the photodiode PD generates and accumulates charges.

At time t7, the enable signal EN is set at Low level to render the transistors M3 and M6 non-conductive. This renders the transistors M4 and M7 non-conductive.

In the above manner, the sensor S completes a series of operations in the reset driving RD. That is, in the reset driving RD, the photodiode PD is reset, the clamp capacitor $C_{CL}$ holds a voltage corresponding to kTC noise generated by the photodiode PD of the first portion ps1, and the capacitors CS1, CS2, and CN are initialized.

Note that the reset driving RD is collectively performed for all the sensors, and the reset driving RD can be performed at the same timing as that described above afterward (for example, between time t31 and time t32). In addition, it is possible to maintain the continuity of data between adjacent pixels by preventing the occurrence of a control timing shift.

Subsequently, in the sampling driving SD, the sensor S is driven with two sensitivities to hold signals obtained with the respective sensitivities in the capacitors CS1 and CS2. More specifically, as exemplified by (C) in FIG. 3, the enable signal EN is set at High level to render the transistors M3 and M6 conductive at time t11, thereby making the transistors M4 and M7 be ready for a source follower operation. Note that at time t11, the signal WIDE is at Low level, and the sensor S is set in a high-sensitivity mode corresponding to the first sensitivity.

The gate voltage of the transistor M4 (that is, the voltage of the FD capacitor $C_{FD}$) has changed in accordance with the amount of charges generated and accumulated in the photodiode PD. One terminal n1 of the clamp capacitor $C_{CL}$ receives a voltage corresponding to the changed gate voltage, and the potential of the terminal n1 changes. The potential of the other terminal n2 of the clamp capacitor $C_{CL}$ changes in accordance with a change in the potential of the terminal n1. In this case, as described above, the clamp capacitor $C_{CL}$ is holding a voltage corresponding to kTC noise, and hence outputs the amount of change in potential to the third portion ps3.

At time t12, the signal TS1 is set at High level to render the transistor M8 conductive. That is, the sensor S starts sampling an output value from the second portion ps2 in the above high-sensitivity mode. More specifically, the capacitor CS1 is set at the voltage of an output value from the second portion ps2 (a voltage corresponding to the gate voltage of the transistor M7) based on driving at time t11. At time t13, the exposure permission signal 114 is set at Low level (inhibited state) because the sensor S has started sampling at time t12. Subsequently, at time t14, the signal TS1 is set at Low level to render the transistor M8 conductive. That is, the sensor S holds an output value from the second portion ps2. More specifically, the voltage of the capacitor CS1 is fixed to the output value from the second portion ps2.

That is, in the interval between time t12 and time t14, the holding unit (capacitor CS1) of the first unit $U_{SH1}$ holds the first signal obtained with the first sensitivity.

At time t15, the signal WIDE is set at High level to render the transistor M1 for sensitivity switching conductive. With this operation, the capacitor $C_{FD}'$ is electrically connected to the photodiode PD via the transistor M1, and the gate voltage of the transistor M4 is set to the voltage of the composition capacitor of the FD capacitor $C_{FD}$ and the capacitor $C_{FD}'$. Since the value of the composition capacitor is larger than the value of the FD capacitor $C_{FD}$, the gate voltage of the transistor M4 does not easily change. That is, the sensor S switches to the low-sensitivity mode corresponding to the second sensitivity. On the other hand, it is possible to further read out charges from the photodiode PD.

At time t16, the signal TS2 is set at High level to render the transistor M11 conductive. That is, the sensor S starts sampling an output value from the second portion ps2 in the above low-sensitivity mode. More specifically, the capacitor CS2 is set at the voltage of an output value from the second portion ps2 (a voltage corresponding to the gate voltage of the transistor M7) based on driving at time t15. Subsequently, at time t17, the signal TS2 is set at Low level to render the transistor M11 non-conductive. That is, the sensor S holds an output value from the second portion ps2. More specifically, the voltage of the capacitor CS2 is fixed to the output value from the second portion ps2.

That is, in the time interval between time t16 and time t17, the holding unit (capacitor CS2) of the second unit $U_{SH2}$ holds the second signal obtained with the second sensitivity.

Subsequently, at time t18, the signal PRES is set at High level to render the transistor M2 conductive. This resets the voltages of the FD capacitor $C_{FD}$ and capacitor $C_{FD}'$ to the reference voltage VRES, and also resets the voltage at the terminal n1 to the same state as that set at time t3.

At time t19, the signal PCL is set at High level to render the transistor M5 conductive. The clamp voltage VCL is then input to the other terminal n2 of the clamp capacitor $C_{CL}$ (the terminal on the transistor M7 side).

At time t20, the signals PRES and WIDE are set at Low level to render the transistors M1 and M2 non-conductive. With this operation, the capacitor $C_{FD}'$ is fixed to a voltage obtained immediately after resetting. In addition, the terminal n1 of the clamp capacitor $C_{CL}$ is set to a voltage corresponding to the gate voltage of the transistor M4 obtained immediately after resetting.

At time t21, the signal TN is set at High level to render the transistor M14 conductive. With this operation, the capacitor CN is charged to the voltage of an output value from the second portion ps2 when the gate voltage of the transistor M7 is set to the reference voltage VCL. At time t22, the signal TN is set at Low level to render the transistor M14 non-conductive. This fixes the voltage of the capacitor CN.

That is, in the time interval between time t21 and time t22, the capacitor CN holds a voltage corresponding to fixed pattern noise such as thermal noise, 1/f noise, a temperature difference, and process variations depending on the circuit arrangement of the second portion ps2.

Lastly, at time t23, the signal PCL is set at Low level to render the transistor M5 non-conductive. At time t24, the enable signal EN is set at Low level to render the transistors M3 and M6 non-conductive (render the transistors M4 and M7 non-conductive).

The sensor S completes a series of operations in the sampling driving SD in the above manner. That is, in the sampling driving SD, the capacitors CS1 and CS2 hold the signals obtained with the respective sensitivities of the sensor S, and the capacitor CN holds a voltage corresponding to fixed pattern noise originating from the second portion ps2.

Note that like the reset driving RD described above, the sampling driving SD can be collectively performed for all the sensors to prevent the occurrence of a control timing shift in each sensor unit 120. For example, the sampling driving SD to be performed afterward (for example, in the time interval between time t41 and time t43) can be performed at the same timing as that described above.

Figure 4:
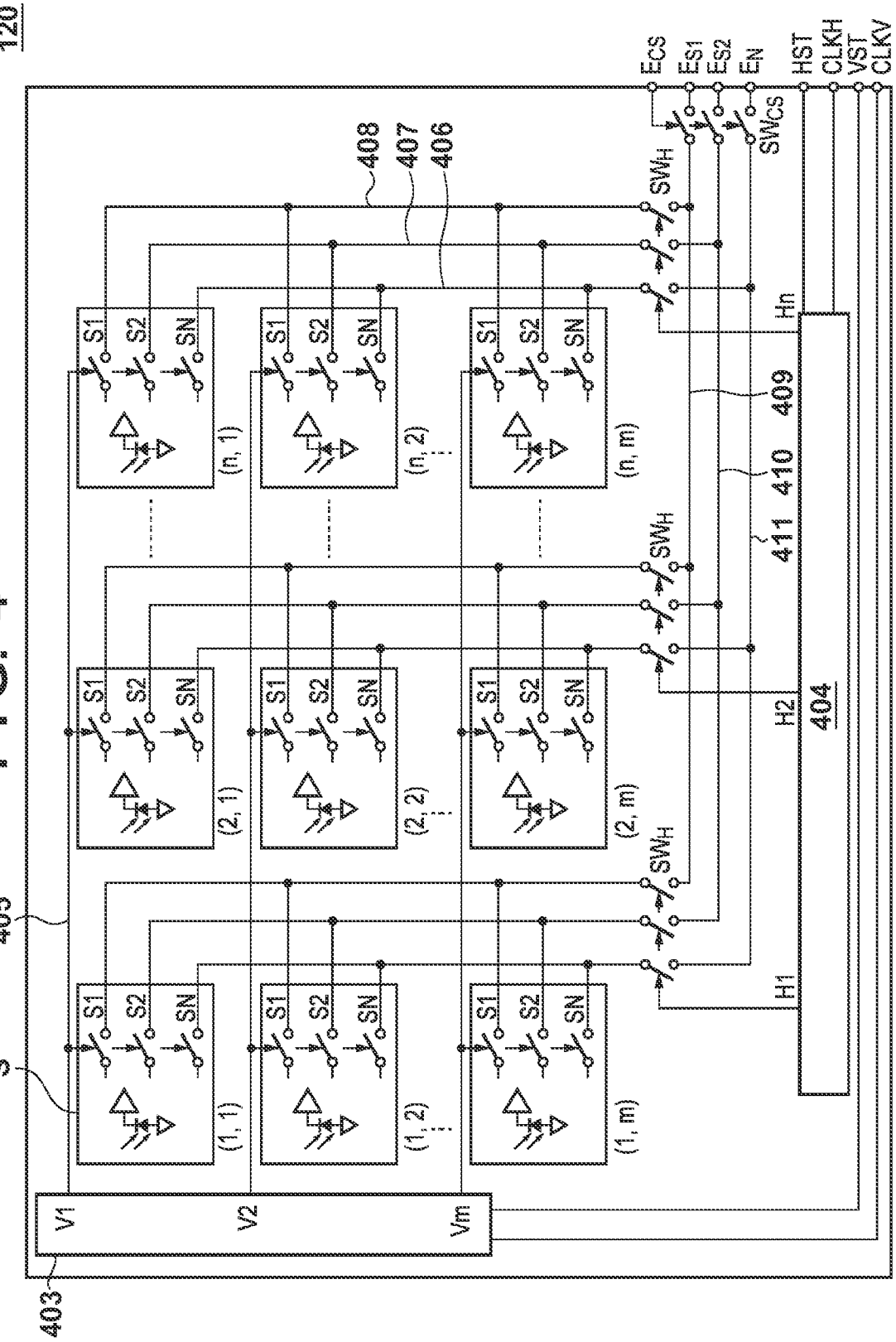
FIG. 4 is a block diagram for explaining an example of the arrangement of a sensor unit.

An example of the arrangement of each sensor unit 120 will be described next with reference to FIG. 4. As described above, the sensor panel 105 having a large size can be formed by tiling the plurality of sensor units 120 on a base, as described above. Each sensor unit 120 includes the plurality of sensors S arranged in m rows×n columns, a vertical scanning circuit 403 for driving the respective sensors S, and a horizontal scanning circuit 404 for reading out signals from the respective sensors S.

The vertical scanning circuit 403 and the horizontal scanning circuit 404 are formed from, for example, shift registers, and operate based on control signals from the control unit 109. The vertical scanning circuit 403 inputs control signals to the respective sensors S via control lines 405, and drives the respective sensors S on a row basis based on the control signals. For example, the vertical scanning circuit 403 functions as a row selecting unit, and selects the sensors S for signal readout on a row basis. In addition, the horizontal scanning circuit 404 functions as a column selecting unit, selects the sensors S on a column basis based on control signals, and makes the sensors S sequentially output signals (horizontal transfer). In this case, the operating frequency of the row selecting unit (vertical scanning circuit 403) is higher than that of the column selecting unit (horizontal scanning circuit 404). That is, the row selecting unit (vertical scanning circuit 403) operates slower than the column selecting unit (horizontal scanning circuit 404).

In addition, each sensor unit 120 includes a terminal $E_{S1}$ for reading out the first signal held in the capacitor CS1 of each sensor S, a terminal $E_{C2}$ for reading out the second signal held in the capacitor CS2, and a terminal $E_N$ for reading out the voltage held in the capacitor CN. Each sensor unit 120 further includes a select terminal $E_{CS}$. Activating a signal received by the terminal $E_{CS}$ can read out a signal from each sensor S of the sensor unit 120 via the terminals $E_{S1}$, $E_{S2}$, and $E_N$.

More specifically, the terminals S1, S2, and N of each sensor S described above are respectively connected to column signal lines 406 to 408 corresponding to the respective terminals. The column signal lines 406 to 408 are respectively connected to analog output lines 409 to 411 via switches $SW_H$ which are rendered conductive in response to control signals from the horizontal scanning circuit 404. Signals from the analog output lines 409 to 411 are output from the terminals $E_{S1}$, $E_{S2}$, and $E_N$ via switches $SW_{CS}$ which are rendered conductive in response to signals received by the select terminal $E_{CS}$.

In addition, each sensor unit 120 includes terminals HST, CLKH, VST, and CLKV which receive control signals for controlling the vertical scanning circuit 403 and the horizontal scanning circuit 404. The terminal HST receives a start pulse input to the horizontal scanning circuit 404. The terminal CLKH receives a clock signal input to the horizontal scanning circuit 404. The terminal VST receives a start pulse input to the vertical scanning circuit 403. The terminal CLKV receives a clock signal input to the vertical scanning circuit 403. These control signals are input from the control unit 109.

With the arrangement exemplified above, the sensor unit 120 controls the sensors S on a row basis, and outputs signals held in the respective holding units on a column basis (performs horizontal transfer), thereby performing signal readout.

Figure 5:
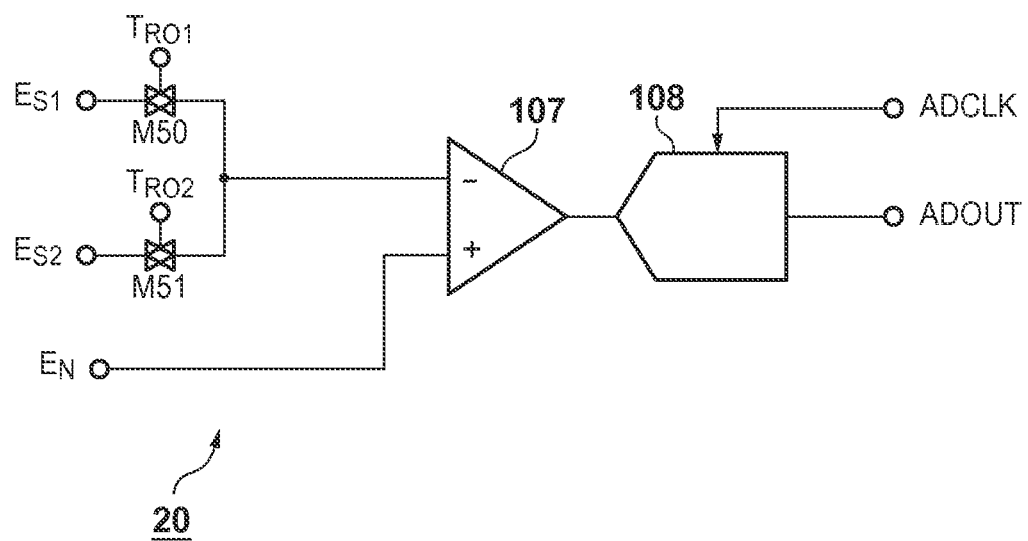
FIG. 5 is a circuit diagram for explaining an example of the arrangement of a signal readout unit.

FIG. 5 exemplifies the circuit arrangement of the signal readout unit 20. The signal readout unit 20 can include the signal amplifying unit 107 including, for example, a differential amplifier, and the A/D conversion unit 108 which performs A/D conversion. The inverting input terminal of the signal amplifying unit 107 receives a signal from the terminal $E_{S1}$ via a switch M50 which is rendered conductive in response to a control signal from a terminal $T_{RO1}$. The inverting input terminal also receives a signal from the terminal $E_{S2}$ via a switch M51 which is rendered conductive in response to a control signal from a terminal $T_{RO2}$. The switches M50 and M51 are controlled to input one of signals from the terminals $E_{S1}$ and $E_{S2}$ to the inverting input terminal. Note that the switches M50 and M51 and the signal amplifying unit 107 may be designed to have response characteristics which can follow the period of the signal ADCLK.

The non-inverting input terminal of the signal amplifying unit 107 receives a signal from the terminal $E_N$. The signal amplifying unit 107 amplifies the difference between a signal from the terminal $E_{S1}$ and a signal from the terminal $E_N$ or the difference between a signal from the terminal $E_{S2}$ and a signal from the terminal $E_N$. The A/D conversion units 108 A/D-converts the difference based on the clock signal input via a terminal ADCLK. With this arrangement, the signal readout unit 20 removes the above fixed pattern noise, obtains image data (digital data) from the sensor unit 120, and outputs the data to the control unit 109 via a terminal ADOUT.

Figure 6:
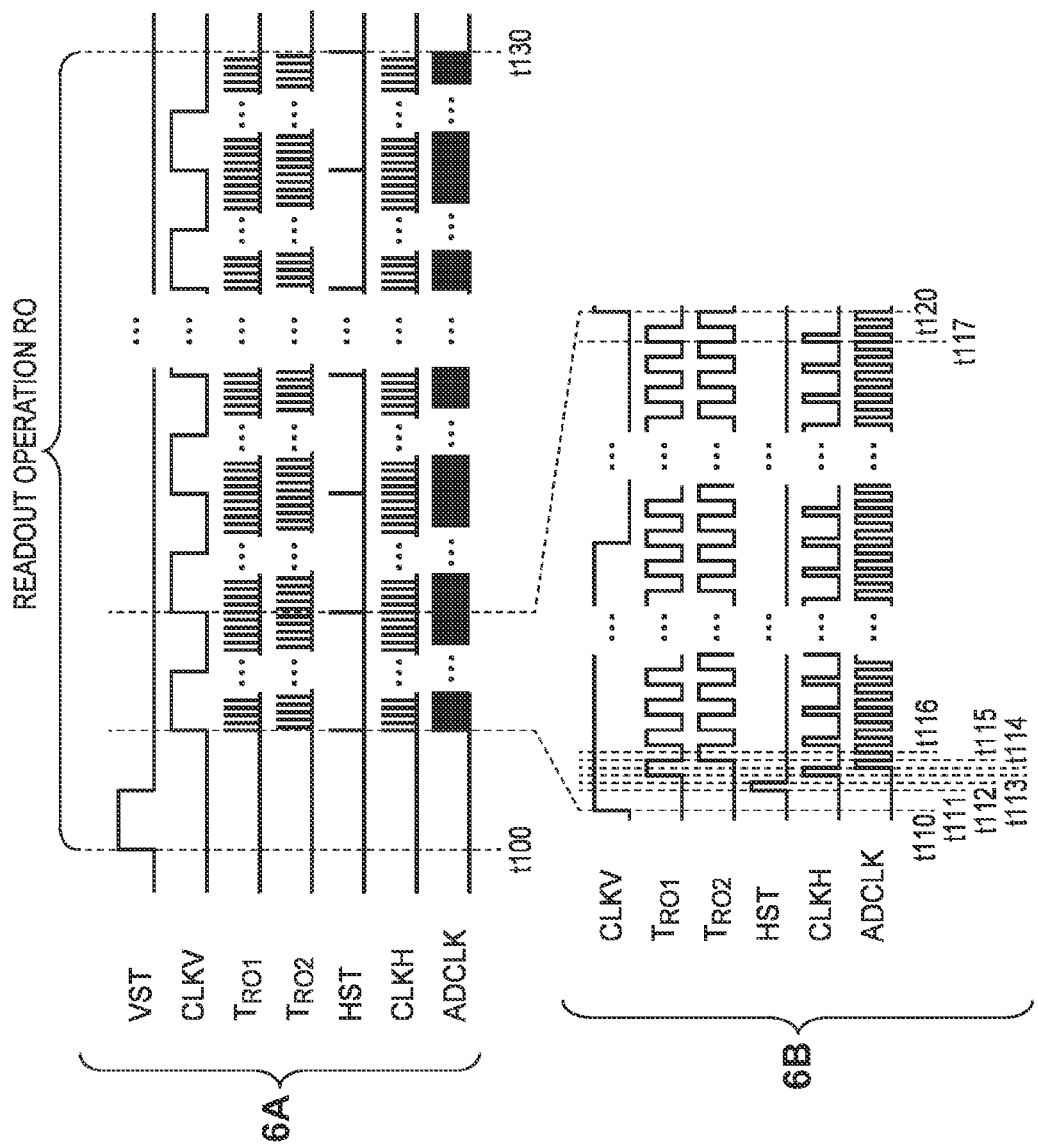
FIG. 6 is a timing chart for explaining an example of a method of controlling the signal readout unit.
Figure 7:
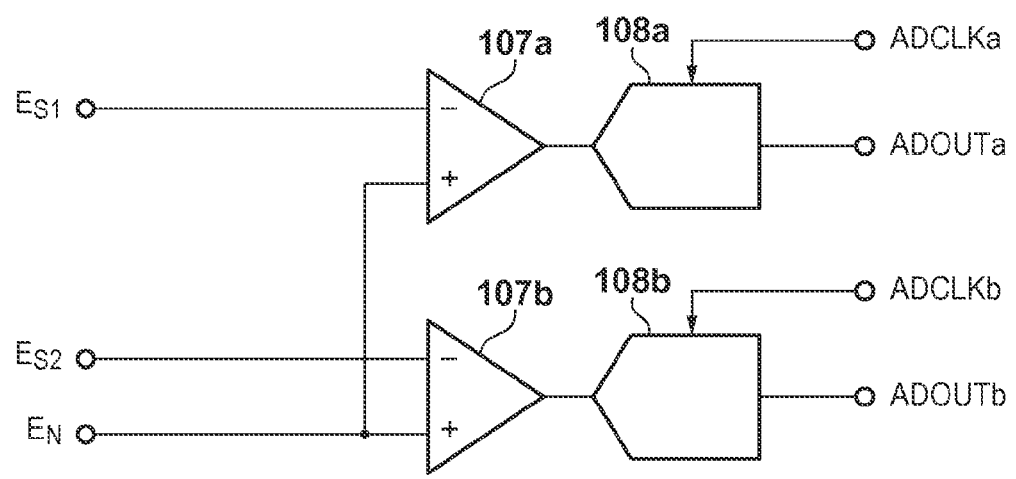
FIG. 7 is a circuit diagram for explaining another example of the arrangement of a signal readout unit.

A method of controlling the imaging apparatus 100 for signal readout according to this embodiment will be described below with reference to FIG. 6. FIG. 6 exemplifies a timing chart for signal readout based on the control signals input to the respective terminals for control (VST, CLKV, $T_{RO1}$, $T_{RO2}$, HST, CLKH, and ADCLK). Note that when reading out a signal from the sensor unit 120, the imaging apparatus 100 inputs a High-level signal to the terminal $E_{CS}$ of the sensor unit 120 to render the switches $SW_{CS}$ conductive.

A control signal input to each terminal will be simply referred to as a "signal" hereinafter, and represented by the symbol of a corresponding terminal. For example, a control signal input to the terminal VST is written as a signal VST (the same applies to other control signals).

As indicated by (A) in FIG. 6, the signal VST is set at High level (a start pulse at the terminal VST is received) at time t100. This makes the vertical scanning circuit 403 select the sensors S on the first row. Subsequently, the vertical scanning circuit 403 receives the clock signals CLKV until time t130. Every time receiving the clock signal CLKV, the vertical scanning circuit 403 sequentially shifts the selected row from the first row to the mth row. That is, the vertical scanning circuit 403 sequentially selects the sensors S on a row basis from the first row to the mth row in the time interval between time t100 and time t130.

In addition, while the vertical scanning circuit 403 selects the sensors S on one row (for example, in the time interval between time t110 and time t120), the horizontal scanning circuit 404 selects the sensors S on a column basis from the first column to the nth column to sequentially make the sensors S output signals. That is, for example, in the time interval between time t110 and time t120, the horizontal scanning circuit 404 horizontally transfers signals from the sensors S on the first row. More specifically, the imaging apparatus 100 performs the sequence exemplified by (B) in FIG. 6.

First of all, upon receiving the clock signal CLKH at time t110, the horizontal scanning circuit 404 receives a start pulse at the terminal HST at time t11 (sets the signal HST at High level in the time interval between time t11 and time t112). This sets the horizontal scanning circuit 404 so as to select the sensor S, out of the sensors S on the first row, which corresponds to the first column.

Subsequently, the horizontal scanning circuit 404 receives the clock signals CLKH until time t120. Every time the horizontal scanning circuit 404 receives the clock signal CLKH, the horizontal scanning circuit 404 sequentially shifts the selected column from the first column to the nth column. In this case, the horizontal scanning circuit 404 selects the sensor S on a given column to render the switches SW9, SW12, and SW15 conductive. As a consequence, signals in the above holding units (the capacitor CS1 and the like) are respectively output to the corresponding column signal lines 406 to 408. While the horizontal scanning circuit 404 selects the sensor S on this column, the signal output from the sensor S is read out.

For example, at time t113, the clock signal CLKH is set at High level to select the sensor S on the first row/first column, and the signal $T_{RO1}$ is set at High level to output the first signal (the signal in the capacitor CS1) from the sensor S. Thereafter, at time t114, the clock signal CLKH is set at Low level, and the signal ADCLK is set at High level to perform A/D conversion of the first signal. At time t115, the signal $T_{RO1}$ is set at Low level, and the signal $T_{RO2}$ is set at High level to output the second signal (the signal in the capacitor CS2) from the sensor S. Thereafter, at time t116, the signal ADCLK is set at High level to perform A/D conversion of the second signal. Note that as described above, these A/D converting operations are performed for differences from a reference signal (the signal in the capacitor CN) to remove fixed pattern noise.

That is, in the time interval between time t113 and time t116, the horizontal scanning circuit 404 selects the sensor S, out of the sensors S on the first row selected by the vertical scanning circuit 403, which corresponds to the first column. The sensor S then outputs the first and second signals, and A/D conversion of these signals is performed. As a result, digital signals with the first and second sensitivities are obtained from the sensor S on the first row and first column.

Subsequently, the same control is performed for the second column to the nth column to obtain one-row digital data (digital data obtained with the first and second sensitivities) concerning the first row by time t120.

The above sequence for the respective rows from the second row to the mth row is performed to complete signal readout from the sensors S. The readout digital data are sequentially output as image data to the control unit 109 and can be displayed as radiation images on the display unit 102 through predetermined signal processing in the control unit 109 or the processor 101. In this case, the image data interface 111 can transmit the digital data from the control unit 109 to the processor 101 in the order in which they are read out by the signal readout unit 20.

In the above operation, both the signals obtained with the first and second sensitivities are read out. With this operation, however, the imaging apparatus 100 may generate a radiation image by selectively using one of the signals. If one signal cannot be output, the apparatus may replace the signal with the other signal. The apparatus may use both the signals. Note that in the operation mode of selectively using one signal, if the signal cannot be output, the imaging apparatus 100 may correct the other signal by gain adjustment or the like and using it in place of the signal described above. When using both signals, the imaging apparatus 100 may perform, for example, dynamic range expansion. At this time, if the digital data obtained with the second sensitivity is defective and the digital data obtained with the first sensitivity is normal, the digital data obtained such that the digital data obtained with the first sensitivity is corrected by a gain ratio unless the data is in a saturated region is used in place of the defect-corrected digital data corresponding to the second sensitivity. Alternatively, if the digital data obtained with the first sensitivity is defective and the digital data obtained with the second sensitivity is normal, the digital data obtained such that the digital data obtained with the second sensitivity is corrected by a gain ratio unless the data is in a noise region is used in place of the defect-corrected digital data corresponding to the first sensitivity. This makes it possible to perform defective pixel correction more accurately than defective pixel correction with peripheral pixels.

In this case, when the vertical scanning circuit 403 selects a row by outputting a control signal via the control line 405, potential fluctuations are caused at the column signal lines 406 to 408 intersecting with the control line 405 by noise and the like. It is therefore necessary to perform signal readout after the settling of such potential fluctuations (that is, after the lapse of a predetermined period of time since the selection of the row). This can prolong the readout time. This influence becomes conspicuous as the number of rows increases and the wiring capacitance of each column signal line increases accompanying an increase in pixel resolution.

In this embodiment, the first and second signals are read out from each sensor S on a given row and then the first and second signals are read out from each sensor S on the next row. According to the signal readout method of the embodiment, therefore, the number of times of selection of rows by the vertical scanning circuit 403 (to be referred to as a row selection count hereinafter) is m.

When reading out the second signals from all the rows upon reading out the first signals from all the rows, the row selection count is m×2. This embodiment can reduce the row selection count as compared with this reference example. That is, the embodiment is advantageous in speeding up signal readout when reading out the respective signals obtained with a plurality of sensitivities.

Note that the above description has exemplified the arrangement in which the signal readout unit 20 includes the signal amplifying unit 107 and the A/D conversion units 108, and sequentially performs A/D conversion of the first and second signals in the capacitors CS1 and CS2, as shown in FIG. 5. However, the present invention is not limited to this arrangement. For example, as exemplified by FIG. 7, the signal readout unit 20 may be provided with signal amplifying units 107a and 107b and A/D conversion units 108a and 108b in correspondence with the first and second signals. This arrangement is advantageous in speeding up signal readout by concurrently reading out the first and second signals (outputting and A/D-converting them).

Second Embodiment

The second embodiment will be described with reference to FIG. 8. The first embodiment has exemplified the case in which after the first and second signals are read out from the sensor S on a given column, the first and second signals are read out from the sensor S on the next column. However, the present invention is not limited to this as long as it is configured to read out the first and second signals from each sensor S on a given row and then read out the first and second signals from each sensor S on the next row. This embodiment is configured to read out the first signal from each sensor S on a given row, read out the second signal from each sensor S on the row, and then perform signal readout concerning each sensor S on the next row.

Figure 8:
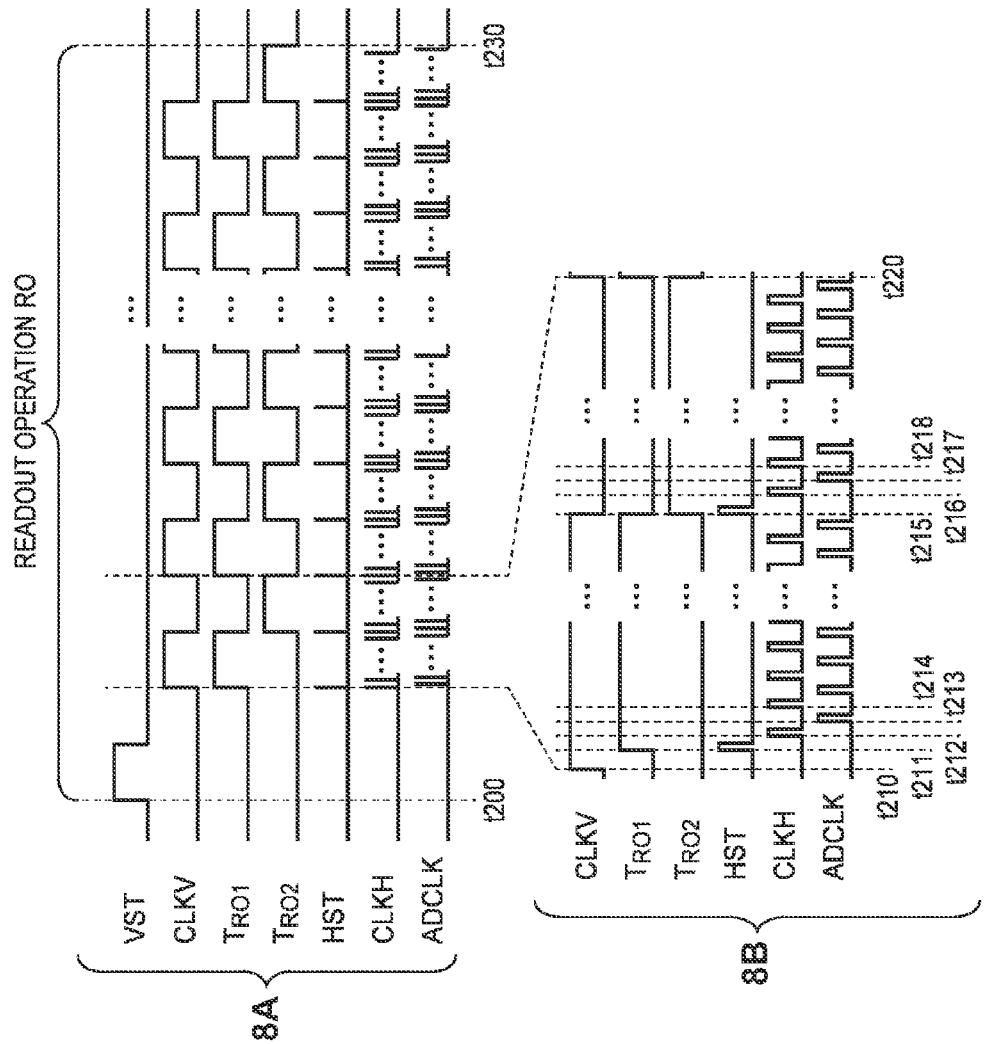
FIG. 8 is a timing chart for explaining another example of the method of controlling the signal readout unit.

Like FIG. 6, FIG. 8 exemplifies a timing chart for explaining a method of controlling an imaging apparatus 100 for signal readout according to this embodiment. The embodiment mainly differs from the first embodiment in the waveforms of signals $T_{RO1}$ and $T_{RO2}$. That is, in the time interval between time t210 and time t220 during which signals are read out from the sensors S on the first row, the imaging apparatus 100 reads out the first signal from each sensor S in the first half period, and then reads out the second signal from each sensor S in the second half period. In addition, the waveforms of signals HST and ADCL are changed from those in the first embodiment (FIG. 6) in accordance with this control method.

More specifically, the imaging apparatus 100 operates in accordance with the following sequence. First of all, at time t200, upon receiving a start pulse at a terminal VST, the imaging apparatus 100 receives a clocks signal CLKV to select each sensor S on the first row at time t210. Subsequently, the signal $T_{RO1}$ is kept at High level, and the signal $T_{RO2}$ is kept at Low level over the time interval between time t211 and time t215. This makes each sensor S be ready to output the first signal.

Upon receiving a start pulse at the terminal HST at time t211, the clock signal CLKH is input at time t212. As described in the first embodiment, a horizontal scanning circuit 404 sequentially shifts the selected column from the first column to the nth column every time the clock signal CLKH is received. During the period of each clock signal CLKH (for example, time t213), the signal ADCLK is input. This makes the sensor array 10 perform A/D conversion of the first signals from the sensors S on the selected column. Thereafter, for example, at time t214, the sensors S on the next column is selected, and the first signals from the sensors S are output and A/D-converted in the same manner. In this manner, the imaging apparatus 100 sequentially performs readout operation of the first signals from the first column to the nth column on a column basis. Subsequently, at time t215, the signal $T_{RO1}$ is set at Low level, the signal $T_{RO2}$ is set at High level, and readout operation of the second signals from the first column to the nth column is sequentially performed on a column basis according to the same procedure as described above. In this case, an image data interface 111 can transmit the digital data from a control unit 109 to a processor 101 for each row of a sensor panel 105 in the order in which they are read out by a signal readout unit 20.

According to this embodiment, upon reading out the first signal from each sensor S on a given row, the imaging apparatus 100 reads out the second signal from each sensor S on the row, and then performs signal readout concerning each sensor S on the next row. With this control method, the row selection count by a vertical scanning circuit 403 is m. That is, the same effect as that in the first embodiment is obtained. This control method is advantageous when, for example, the signal readout speed is limited by the operating speed of a signal amplifying unit 107 or by the frequency of the signal ADCLK or the frequencies of the signal $T_{RO1}$ and $T_{RO2}$.

Third Embodiment

The third embodiment will be described with reference to FIGS. 9 to 11. Each embodiment described above has exemplified the case in which two signals obtained with two sensitivities are sequentially read out. However, this signal readout may be performed in accordance with an operation mode, and one of two signals may be read out in another operation mode.

Figure 9:
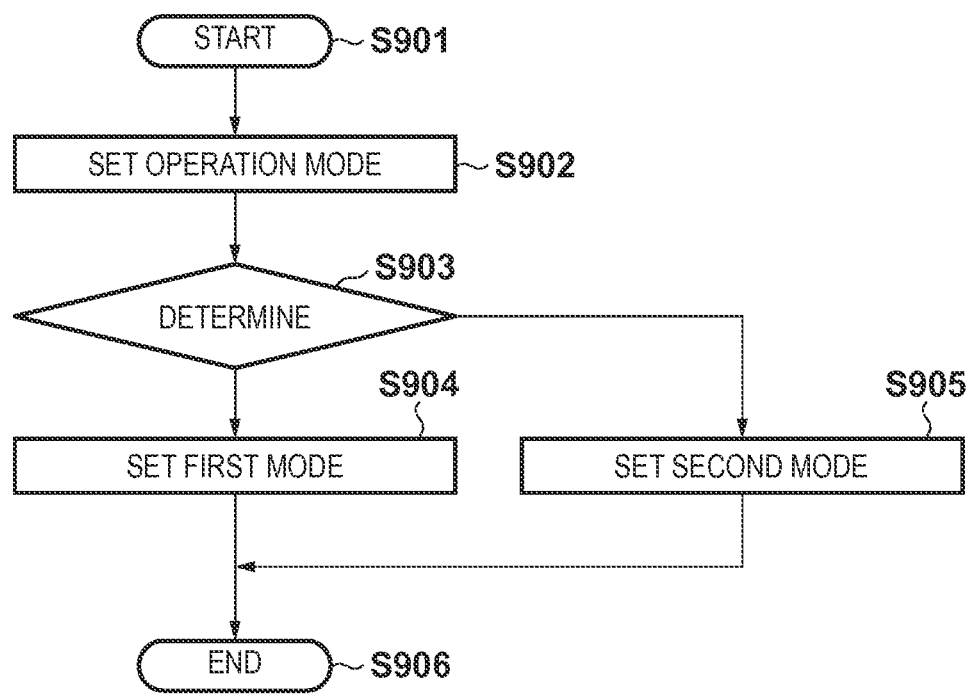
FIG. 9 is a flowchart for explaining an example of a method of setting an operation mode in the radiation imaging apparatus.

FIG. 9 exemplifies a flowchart for the operation of an imaging apparatus 100 following a plurality of operation modes. The imaging apparatus 100 can have, as operation modes, the first mode of reading out only one of two signals and the second mode of reading out both signals (for example, a mode of performing dynamic range expansion).

First of all, in step S901 (to be simply referred to as "S901" hereinafter, and the same applies to other steps), the imaging apparatus 100 starts setting an operation mode. In S902, a control unit 109 receives setting information or imaging information from a processor 101 via a control interface 110. In S903, an operation mode is determined based on the setting information or imaging information from the processor 101. The control unit 109 sets the first mode in S904, or the second mode in S905 based on this determination result. Alternatively, the control unit 109 sets the second mode in S905. Lastly, setting the operation mode is complete in S906.

Figure 10:
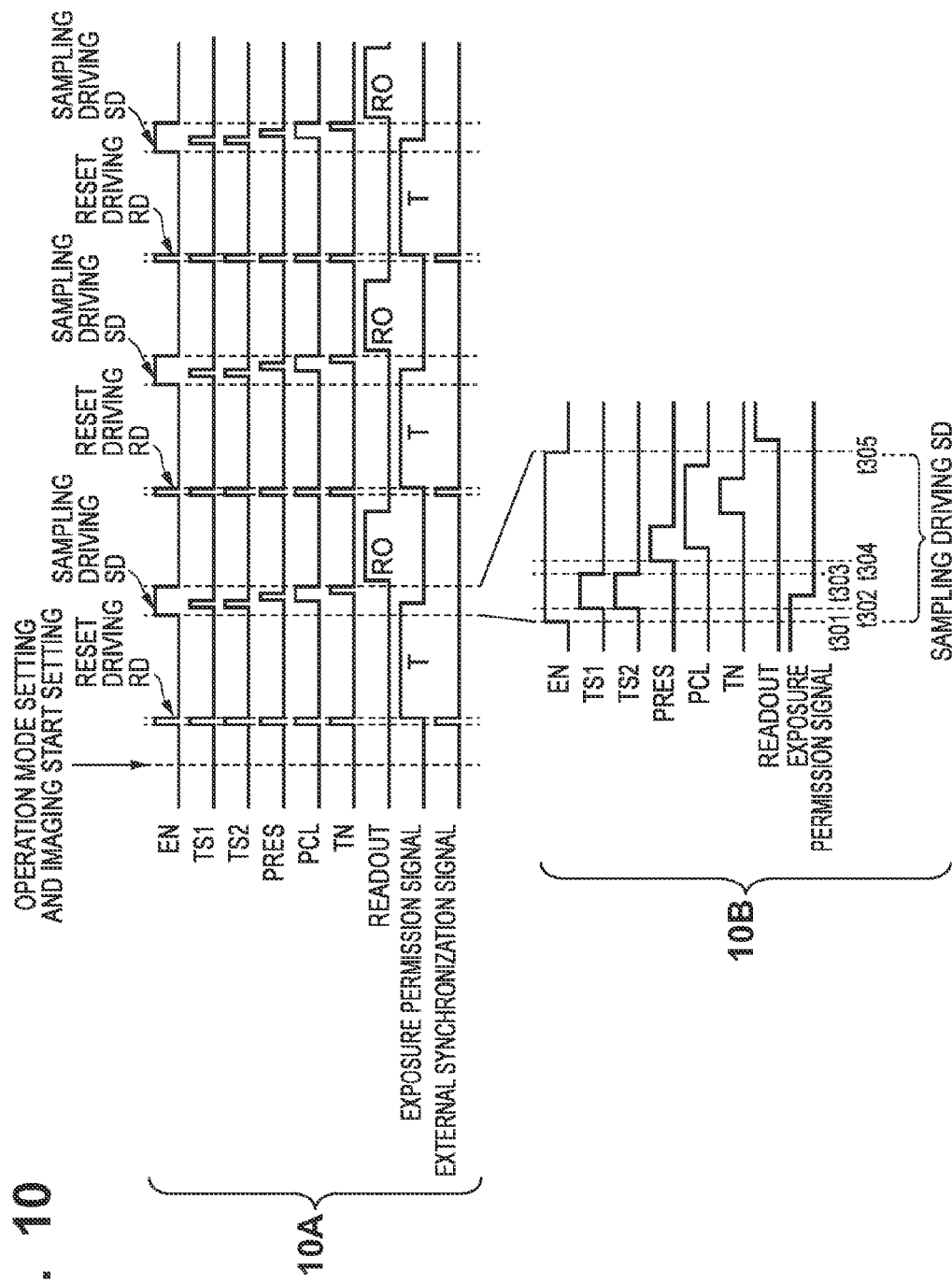
FIG. 10 is a timing chart for explaining a method of controlling a sensor in an example of an operation mode.

FIG. 10 exemplifies a method of driving a sensor S in the first mode of reaching out one of two signals from each sensor S. In the first mode, each sensor S may be driven according to the same procedure as that in the first embodiment (FIG. 3) concerning one of the first and second sensitivities. More specifically, in sampling driving SD, while a signal WIDE is fixed to one of High level and Low level, at least one of signals TS1 and TS2 may be driven.

For example, the signal WIDE is fixed to Low level in the high-sensitivity level, and to High level in the low-sensitivity mode. One of the signals TS1 and TS2 may be activated or both of the signals may be activated. The following will exemplify a case in which both the signals are activated. In this, however, two signals obtained by this operation are at the same signal level. Note that reset driving RD may be performed in the same manner as in the first embodiment.

More specifically, an enable signal $E_N$ is kept at High level over the time interval between time t301 and time t305, and the signals TS1 and TS2 are kept at High level in the time interval between time t302 and t303. This makes capacitors CS1 and CS2 hold signals of the same level. In the subsequent time interval between time t304 and time t305, a capacitor CN holds a reference signal for the removal of fixed pattern noise as in the first embodiment described above.

FIG. 11 exemplifies a timing chart for explaining a method of controlling the imaging apparatus 100 for reading out signals obtained in the first mode described above. Although not shown, the imaging one of signals $T_{RO1}$ and $T_{RO2}$ is activated in accordance with one of the two holding units (the capacitors CS1 and CS2) from which a signal should be read out. As exemplified in the time interval between time t410 and time t411, the holding units of the sensors S sequentially output signals on a column basis from the first column to the nth column concerning the first row, and the output signals are A/D-converted.

As described above, according to this embodiment, it is possible to control the imaging apparatus 100 in accordance with an operation mode. It is possible to perform signal readout with importance being attached to a frame rate in the first mode of reading out only one of two signals from each sensor S. In contrast to this, the second mode of reading out both signals from each sensor S may be controlled in the same manner as in the first and second embodiments.

Fourth Embodiment

Figure 12:
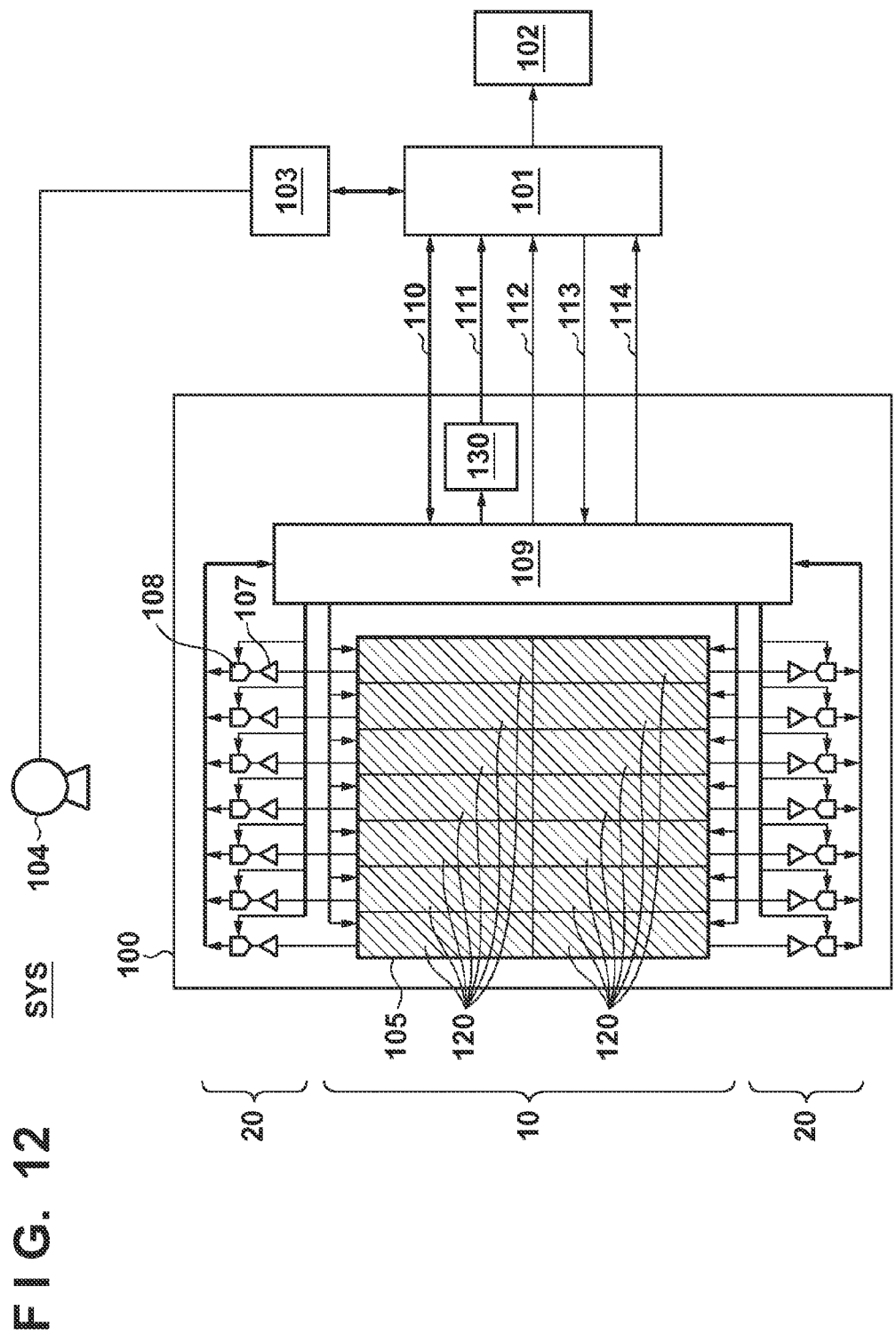
FIG. 12 is a block diagram for explaining another example of the arrangement of the radiation imaging system.

The fourth embodiment will be described with reference to FIGS. 12 and 13. The first embodiment described above has exemplified (FIG. 1) the arrangement in which the processor 101 performs predetermined processing for the two signals read out from the sensor array 10. However, the present invention is not limited to this arrangement. For example, an imaging apparatus 100 may internally perform part of processing. For example, as exemplified by FIG. 12, the imaging apparatus 100 may include, between a control unit 109 and a processor 101, a second processor 130 which performs processing (for example, processing for dynamic range expansion) using the two signals read out from each sensor S. The second processor 130 composites, for example, image data obtained with the first sensitivity corresponding to the high-sensitivity mode and image data obtained with the second sensitivity corresponding to the low-sensitivity mode. An image data interface 111 can output the composition data or composition signal generated in this manner to the processor 101. This arrangement can reduce the load of computation processing on the processor 101.

Figure 13:
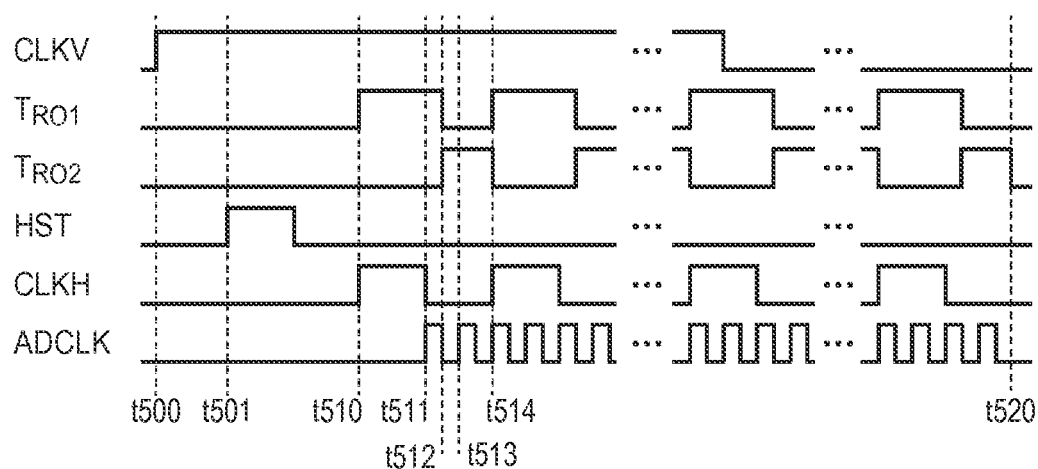
FIG. 13 is a timing chart for explaining another example of the method of controlling the signal readout unit.

FIG. 13 exemplifies a timing chart corresponding to one row concerning readout operation RO according to this embodiment. First of all, at time t500, a clock signal CLKV is set at High level to select, for example, each sensor S on the first row. At time t501, a start pulse is input to a terminal HST to cause the horizontal scanning circuit 404 to select the sensors S on the first column.

At time t510, a horizontal scanning circuit 404 selects the sensors S on the first column upon receiving the clock signal CLKH, and a signal $T_{RO1}$ is set at High level to output the first signal obtained with the first sensitivity in the sensor S. Thereafter, at time t511, a signal ADCLK is set at High level, and the first signal is A/D-converted. At time t512, the signal $T_{RO1}$ is set at Low level the signal $T_{RO2}$ is set at Low level to output the second signal obtained with the second sensitivity of the sensor S. Thereafter, at time t513, the signal ADCLK is set at High level the two signals are A/D-converted.

At time t514, upon reception of a clock signal CLKH, the horizontal scanning circuit 404 selects the sensors S on the next column (second column). At this time, the control unit 109 can perform control to skip digital data corresponding to two signals ADCLK and read digital data corresponding to two signals ADCLK, that is, the third and fourth signals. Subsequently, the control unit 109 performs similar control concerning the second column to the nth column to obtain one-row digital data (digital data obtained with the first and second sensitivities) concerning the first row by time t520.

The control unit 109 sequentially outputs the digital data obtained in the above manner to the processor 130, thereby generating composition data through predetermined processing. The composition data is output to the processor 101 via the image data interface 111.

As described above, this embodiment can also obtain the same effects as those of each embodiment described above. Although this embodiment has exemplified the case in which the frequency of the signal ADCLK is four times that of the clock signal CLKH, the present invention is not limited to this arrangement. The frequency can be changed as needed.

Although the four embodiments have been described above, the present invention is not limited to them. The objects, states, applications, functions, and other specifications of the present invention can be changed as needed, and other embodiments can implement the present invention. For example, each embodiment described above has exemplified the sensor panel 105 formed by tiling the plurality of sensor units 120. However, the present invention is not limited to the arrangement of each embodiment as long as an apparatus to which the present invention is applied includes the sensor array 10 having an array of a plurality of sensors and can control the respective sensors on a row basis and a column basis. In addition, the methods of the respective embodiments may be combined. For example, the method of the readout operation RO according to the second embodiment may be applied to the readout operation RO according to the fourth embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-138444, filed Jul. 1, 2013, which is hereby incorporated by reference herein in its entirety.

What is claimed is:

1. A radiation imaging apparatus comprising:
a sensor array, in which a plurality of sensors configured to detect radiation with first sensitivity and second sensitivity which are different from each other are arranged such that the plurality of sensors form a plurality of rows and a plurality of columns, wherein each of the plurality of sensors also includes a first sample/hold circuit configured to sample and hold a first signal obtained with the first sensitivity and a second sample/hold circuit configured to sample and hold a second signal obtained with the second sensitivity;
a row selecting unit configured to select each sensor of the sensor array on a row basis;
a signal readout unit configured to read out a signal from each sensor on a row selected by the row selecting unit; and
a control unit configured to
perform first control to control the sensor array so as to make the first sample/hold circuits collectively sample and hold the first signals in the plurality of sensors and make the second sample/hold circuits collectively sample and hold the second signals in the plurality of sensors, and
perform second control to control the row selecting unit so as to make the signal readout unit read out the first signal and the second signal obtained by the first control from each sensor,
wherein, in the second control, after the signal readout unit reads out the first signal and the second signal, in sequence, respectively held by the first sample/hold circuit and the second sample/hold circuit of each sensor on a row selected by the row selecting unit, the control unit controls the row selecting unit to select each sensor on a row different from the selected row.

2. The apparatus according to claim 1, further comprising a column selecting unit configured to select, for each column, a sensor, out of the sensors on a row selected by the row selecting unit, from which a signal is to be read out by the signal readout unit,
wherein in the second control, after the signal readout unit reads out the first signal and the second signal, in sequence, respectively held by the first sample/hold circuit and the second sample/hold circuit of a sensor on a column selected by the column selecting unit, the control unit further controls the column selecting unit to select a sensor on a next column.

3. The apparatus according to claim 1, further comprising a column selecting unit configured to select a sensor, of the sensors on a row selected by the row selecting unit, from which a signal is to be read out by the signal readout unit for each column,
wherein in the second control, after the signal readout unit reads out the first signal held by the first sample/hold circuit of each sensor on a row selected by the row selecting unit, the control unit further controls the column selecting unit so as to make the signal readout unit read out the second signal held by the second sample/hold circuit of each sensor on the row.

4. The apparatus according to claim 1, wherein one of the first signal, the second signal, and a composition signal of the first signal and the second signal is output in accordance with an operation mode.

5. The apparatus according to claim 1, wherein when one of the first signal and the second signal is not configured to be output in an operation mode of outputting one of the first signal and the second signal, a signal based on the other of the first signal and the second signal is output in place of the one signal.

6. The apparatus according to claim 1, wherein each of the plurality of sensors includes a conversion element configured to output an electrical signal corresponding to a radiation dose, a first capacitor connected to the conversion element, and a second capacitor connected to the conversion element via a switch element, and
the control unit changes a sensitivity of each sensor by using the switch element.

7. The apparatus according to claim 1, wherein the sensor array is formed by arranging a plurality of sensor units, each including a plurality of sensors, on a base.

8. A radiation inspection apparatus comprising:
a radiation imaging apparatus defined in claim 1; and
a processor configured to process a signal from the radiation imaging apparatus.

9. The apparatus according to claim 1, wherein each of the plurality of sensors includes
a first switch configured to output the first signal which is held by the first sample/hold circuit, and a second switch configured to output the second signal which is held by the second sample/hold circuit, and the row selecting unit selects each sensor of the sensor array on a row basis, by setting the first switch and the second switch to conductive state on a row basis.

10. The apparatus according to claim 1, wherein the first sensitivity is more sensitive than the second sensitivity.

11. The apparatus according to claim 6, wherein, in each sensor, the first sample/hold circuit samples and holds the first signal while the switch element between the conversion element and the second capacitor is in a non-conductive state, and then, after the switch element enters a conductive state, the second sample/hold circuit samples and holds the second signal.

12. The apparatus according to claim 2, wherein each of the plurality of sensors further includes a third sample/hold circuit configured to sample and hold a reference signal, the control unit further controls the sensor array, in the first control, so as to make the third sample/hold circuits collectively sample and hold the reference signals in the plurality of sensors, the signal readout unit includes:
 a signal amplifying unit, including a first input terminal for receiving the first signal and the second signal and a second input terminal for receiving the reference signal, and configured to amplify and output a difference between a signal received by the first input terminal and a signal received by the second input terminal; and
 an A/D conversion unit configured to perform analog/digital conversion to the signal which is output from the signal amplifying unit, and the control unit controls the sensor array, in the second control, such that the first signal and the second signal are input to the first input terminal, in sequence.

13. The apparatus according to claim 3, wherein each of the plurality of sensors further includes a third sample/hold circuit configured to sample and hold a reference signal, the control unit further controls the sensor array, in the first control, so as to make the third sample/hold circuits collectively sample and hold the reference signals in the plurality of sensors, the signal readout unit includes:
 a signal amplifying unit, including a first input terminal for receiving the first signal and the second signal and a second input terminal for receiving the reference signal, and configured to amplify and output a difference between a signal received by the first input terminal and a signal received by the second input terminal; and
 an A/D conversion unit configured to perform analog/digital conversion to the signal which is output from the signal amplifying unit, and the control unit controls the sensor array, in the second control, such that the first signal and the second signal are input to the first input terminal, in sequence.

14. The apparatus according to claim 13, wherein, for each column of the sensor array, a first column line, a second column line and a third column line are provided, the first column line being connected to the first sample/hold circuit of each sensor of the corresponding column, the second column line being connected to the second sample/hold circuit of each sensor of the corresponding column, and the third column line being connected to the third sample/hold circuit of each sensor of the corresponding column.

15. The apparatus according to claim 14, wherein the signal amplifying unit is provided such that (i) the second input terminal is connectable to the third column line and (ii) the first input terminal is connectable to the first column line and the second column line, selectively.

16. A method of controlling a radiation imaging apparatus including a sensor array, in which a plurality of sensors configured to detect radiation with first sensitivity and second sensitivity which are different from each other are arranged such that the plurality of sensors form a plurality of row and a plurality of columns, a row selecting unit configured to select each sensor of the sensor array on a row basis, and a signal readout unit configured to read out a signal from each sensor on a row selected by the row selecting unit, each of the plurality of sensors also including a first sample/hold circuit configured to hold a first signal obtained with the first sensitivity and a second sample/hold circuit configured to hold a second signal obtained with the second sensitivity, the method comprising:

performing first control of controlling the sensor array so as to make the first sample/hold circuits collectively sample and hold the first signals in the plurality of sensors and make the second sample/hold circuits collectively sample and hold the second signals in the plurality of sensors; and performing second control of controlling the row selecting unit so as to make the signal readout unit read out the first signal and the second signal obtained in the performing the first control from each sensor on a row basis, wherein in the performing the second control, after the signal readout unit reads out the first signal and the second signal, in sequence, respectively held by the first sample/hold circuit and the second sample/hold circuit of each sensor on a row selected by the row selecting unit, the row selecting unit selects each sensor on a row different from the selected row.

* * * * *